J. A. ETZOLD & R. H. NORTH.
ADJUSTABLE REAMER.
APPLICATION FILED JULY 5, 1910.
1,024,399.
Patented Apr. 23, 1912.
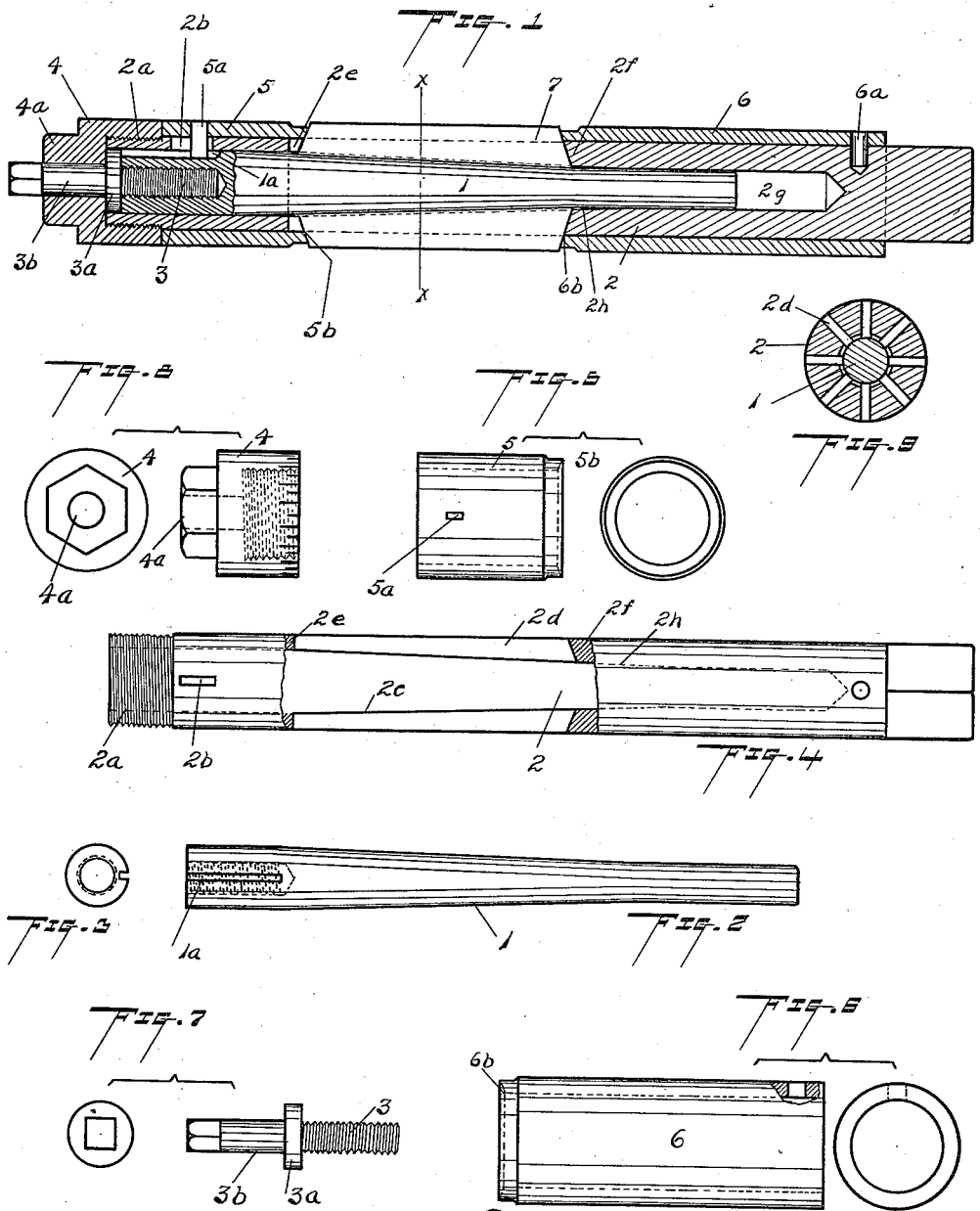
WITNESSES:
Roy Wallis.
Christine A. Braidel.
INVENTORS.
John A. Etzold.
Raymond H. North.
BY
Geo. B. Willcox. ATTORNEY

UNITED STATES PATENT OFFICE.

JOHN A. ETZOLD AND RAYMOND H. NORTH, OF DETROIT, MICHIGAN.

ADJUSTABLE REAMER.

1,024,399.  Specification of Letters Patent.  Patented Apr. 23, 1912.

Application filed July 5, 1910. Serial No. 570,514.

*To all whom it may concern:*

Be it known that we, JOHN A. ETZOLD and RAYMOND H. NORTH, both citizens of the United States, residing at Detroit, in the county of Wayne and State of Michigan, have invented certain new and useful Improvements in Adjustable Reamers; and we do hereby declare the following to be a full, clear, and exact description of the invention, such as will enable others skilled in the art to which it appertains to make and use the same.

This invention is an adjustable reamer.

The objects of the invention are to provide an adjustable reamer, the blades of which can be easily and quickly expanded or retracted by the turning of a single set screw, all the blades being moved exactly the same amount.

A further object of the invention is to provide a simple and efficient means for securely locking the blades in their adjusted position.

With these and certain other objects in view which will be more fully set forth in the specification, our invention consists in the devices illustrated in the accompanying drawings, in which—

Figure 1 is a longitudinal section through the assembled reamer, Fig. 2 is a side view of the adjusting spindle, Fig. 3 is an end view of the same, Fig. 4 is a part sectional view of the reamer barrel, Fig. 5 is a detail of the pilot sleeve, Fig. 6 is a detail of the fixed sleeves, Fig. 7 is a detail of the adjusting screw, Fig. 8 is a detail of the cap nut, and Fig. 9 is a transverse section on the line $x$—$x$ of Fig. 1.

The device consists in a tapered adjusting spindle 1 mounted to slide longitudinally in the central bore of a hollow barrel 2. A threaded adjusting screw 3 formed with a shoulder $3^a$ is screwed into the end of the tapered spindle 1. One end of the barrel 2 is threaded as at $2^a$ to receive an internally threaded cap nut 4 which is apertured as at $4^a$ to take the shank $3^b$ of the adjusting screw 3. Slidably mounted on one end of and surrounding the barrel 2 is a pilot sleeve 5 carrying an inwardly projecting pin $5^a$ that passes through a slot $2^b$ in the barrel 2 and into a key-way $1^a$ of the adjusting spindle 1. The opposite end of the barrel 2 carries a sleeve 6 fixed to the barrel by means of a pin $6^a$.

The tapered part $2^c$ of the barrel 2 intermediate its ends, is radially slotted as at $2^d$ to receive a plurality of reamer blades 7, one end $2^e$ of each slot $2^d$ being out of contact with the blades 7, the other end $2^f$ being beveled to fit the ends of the blades. The opposing ends $5^b$ and $6^b$ of the sleeves 5 and 6 are internally beveled as shown in Figs. 1, 5 and 6, to fit the beveled ends of the adjustable blades 7.

The operation of the blade-adjusting device is as follows:—To force the blades 7 outwardly, the tapered adjusting spindle 1 is forced in, or to the right, as illustrated in Fig. 1. This is accomplished by turning the adjusting screw 3 by means of its shank $3^b$, it being understood that the cap nut 4 is in place on the threaded end $2^a$ of the barrel 2, forming a thrust block to take the pressure of the shoulder $3^a$. As the spindle 1 advances into the tapered bore of the barrel 2, the ends of the blades 7 bear against the beveled faces $6^b$ $2^f$ of the sleeve 6 and the barrel 2, and the blade 7 is forced radially outward until the opposite end of the blade brings up against the beveled end $5^b$ of the pilot sleeve 5, which has been previously adjusted longitudinally to the desired position by means of the cap nut 4, to permit the forward movement of the tapered part of spindle 1 into the reduced bore $2^g$ of barrel 2, the entrance to such bore being enlarged as at $2^h$. The pilot sleeve 5 thus forms a stop by which the outward movement of the blades 7 is limited, and longitudinal adjustment of the sleeve 5 on the barrel 2, by means of the adjusting cap nut 4, determines the amount of such outward movement. If desired, the periphery of the adjusting cap nut 4 may be suitably graduated to indicate in thousandths of an inch or other fractional measurements, the amount that the blades will be set out, as indicated in Fig. 8.

During the adjustment of screw 3 or of nut 4, rotation of the sleeve 5, barrel 2, and spindle 1 relative to each other, is prevented by the pin $5^a$ which is rigidly fixed to sleeve 5, and slides longitudinally in the slot $2^b$ of barrel 2, and in the key-way $1^a$ of the spindle 1.

By the means above described, we have produced a simple, compact, and easily adjustable reamer, adapted to a great variety of work, the adjustment of the blades being effected by the manipulation of a single adjusting screw and a nut.

Having described our invention, what we claim and desire to secure by Letters Patent, is:—

In an adjustable reamer, the combination of a spindle having a tapered portion intermediate its ends and having a key-way at one end; a centrally bored barrel formed with a tapered bore intermediate its ends, one end of said barrel being threaded and having a slot, the tapered portion of said barrel formed with a plurality of radial slots, each of said slots having one end beveled; a shouldered adjusting screw; a cap nut received on the threaded end of said barrel and having its end apertured; a pilot sleeve slidably mounted on one end of said barrel and having an inwardly projecting pin passing through the slot of said barrel and into a key-way of said spindle, one end of said pilot sleeve being internally beveled; a fixed sleeve secured to the opposite end of said barrel, and a plurality of reamer blades formed with beveled ends, said blades received in the slots of said barrel.

In testimony whereof, we affix our signatures in presence of two witnesses.

JOHN A. ETZOLD.
RAYMOND H. NORTH.

Witnesses:
ARCHIBALD M. REID,
BLANCHE G. REID.

Copies of this patent may be obtained for five cents each, by addressing the "Commissioner of Patents, Washington, D. C."